United States Patent [19]
Rieger et al.

[11] Patent Number: 5,389,289
[45] Date of Patent: Feb. 14, 1995

[54] LIQUID-CRYSTALLINE MEDIUM

[75] Inventors: Bernhard Rieger, Yokohama, Japan; Hans A. Kurmeier, Seeheim-Jugenheim, Germany; Eike Poetsch, Mühltal, Germany; Herbert Plach, Darmstadt, Germany; Ekkehard Bartmann, Erzhausen, Germany

[73] Assignee: Merck Patent Gesellschaft mit beschrankter Haftung, Darmstadt, Germany

[21] Appl. No.: 201,159

[22] Filed: Feb. 24, 1994

Related U.S. Application Data

[63] Continuation of Ser. No. 946,689, Sep. 18, 1992, abandoned, which is a continuation of Ser. No. 688,953, May 15, 1991, abandoned.

[30] Foreign Application Priority Data

Mar. 9, 1990 [DE] Germany ............... 4007412

[51] Int. Cl.⁶ ............... C09K 19/52; C09K 19/34; C09K 19/30
[52] U.S. Cl. ............... 252/299.01; 252/299.61; 252/299.63
[58] Field of Search ............... 252/299.01, 299.61, 252/299.63; 359/103

[56] References Cited

U.S. PATENT DOCUMENTS

| | | | |
|---|---|---|---|
| 4,419,264 | 12/1983 | Eidenschink et al. | 252/299.63 |
| 4,814,523 | 3/1989 | Tanaka et al. | 252/299.63 |
| 4,923,632 | 5/1990 | Sawada et al. | 252/299.61 |
| 5,122,295 | 6/1992 | Weber et al. | 252/299.01 |
| 5,238,599 | 8/1993 | Obikawa et al. | 252/299.61 |
| 5,250,220 | 10/1993 | Wacktler et al. | 252/299.61 |
| 5,254,698 | 10/1993 | Coates et al. | 252/299.61 |

FOREIGN PATENT DOCUMENTS 0315014  5/1989  European Pat. Off.

*Primary Examiner*—Shean Wu
*Attorney, Agent, or Firm*—Millen, White, Zelano, & Branigan

[57] ABSTRACT

The invention relates to a liquid-crystalline medium essentially comprising a) 5–65% by weight of a component A, comprising two or more compounds selected from group A:

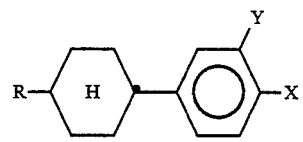

A1

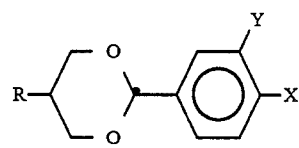

A2

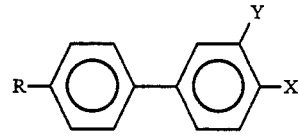

A3

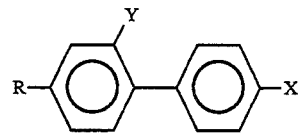

A4 b) 20–95% by weight of a component B comprising two or more compounds selected from group B:

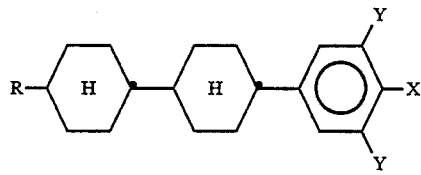

B1

(Abstract continued on next page.)

-continued
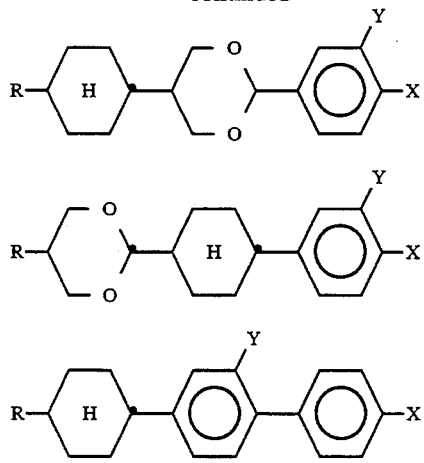
B2
B3
B4
-continued
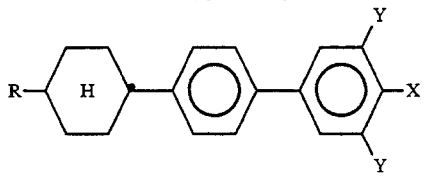
B5
and
c) 0–40% by weight of a component C, comprising one or more compounds having a clearing point above 170° C., where R, X and Y each, independently of one another, have the following meanings:
R is in each case alkyl, oxaalkyl, haloalkyl or alkenyl having up to 7 carbon atoms,
X is F, Cl, $CHF_2$, $CF_3$, $OCHF_2$ or $OCF_3$, and
Y is H, F or Cl.
20 Claims, No Drawings

LIQUID-CRYSTALLINE MEDIUM

This application is a continuation of application Ser. No. 07/946,689, filed Sep. 18, 1992, now abandoned, which is a continuation of application Ser. No. 07/688,953, filed May 15, 1991, now abandoned, based on PCT EP 91/00428, filed Mar. 7, 1991.

The present invention relates to a liquid-crystalline medium, to the use thereof for electrooptical purposes, and to displays containing this medium.

Liquid crystals are used, in particular, as dielectrics in display devices since the optical properties of such substances can be affected by an applied voltage. Electrooptical devices based on liquid crystals are extremely well known to those skilled in the art and may be based on various effects. Devices of this type are, for example, cells having dynamic scattering, DAP (deformation of aligned phases) cells, guest/host cells, TN cells having a twisted nematic structure, STN (super-twisted nematic) cells, SBE (super-birefringence effect) cells and OMI (optical mode interference) cells. The most common display devices are based on the Schadt-Helfrich effect and have a twisted nematic structure.

The liquid-crystal materials must have good chemical and thermal stability and good stability toward electrical fields and electromagnetic radiation. Furthermore, the liquid-crystal materials should have low viscosity and give short addressing times, low threshold voltages and high contrast in the cells. Furthermore, they should have a suitable mesophase, for example, for the abovementioned cells, a nematic or cholesteric mesophase, at customary operating temperatures, i.e. in the broadest possible range above and below room temperature. Since liquid crystals are generally used as mixtures of a plurality of components, it is important that the components are readily miscible with one another. Further properties, such as electrical conductivity, dielectric anisotropy and optical anisotropy, must meet various requirements depending on the cell type and the area of application. For example, materials for cells having a twisted nematic structure should have positive dielectric anisotropy and low electrical conductivity.

For example, the media desired for matrix liquid-crystal displays containing integrated nonlinear elements for switching individual image points (MLC displays) are those having high positive dielectric anisotropy, broad nematic phases, relatively low birefringence, very high specific resistance and a low vapor pressure.

Matrix liquid-crystal displays of the type defined in the preamble are known. Examples of nonlinear elements which can be used to individually switch the individual image points are active elements (i.e. transistors). This is then referred to as an "active matrix", and a differentiation can be made between two types:
1. MOS (Metal Oxide Semiconductor) transistors on a silicon wafer as substrate.
2. Thin-film transistors (TFTs) on a glass plate as substrate.

In type 1, the electrooptical effect used is usually dynamic scattering or the guest-host effect. The use of monocrystalline silicon as the substrate material limits the display size since even the modular assembly of the various part displays results in problems at the joints.

In the case of the more promising type 2, which is preferred, the electrooptical effect used is usually the TN effect. A differentiation is made between two technologies: TFTs comprising compound semiconductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counterelectrode. Compared with the size of the image point electrode, the TFT is very small and hardly affects the image at all. This technology can also be extended to fully colour-compatible image displays, where a mosaic of red, green and blue filters is arranged in such a manner that each filter element is located opposite a switchable image element.

The TFT displays usually operate as TN cells with crossed polarisers in transmission and are illuminated from the back.

The term MLC display here covers any matrix display containing integrated nonlinear elements, i.e. in addition to the active matrix, also displays containing passive elements such as varistors or diodes (MIM=-metal-insulator-metal).

MLC displays of this type are particularly suitable for TV applications (for example pocket TV sets) or for high-information displays in automobile or aircraft construction. In addition to problems with respect to the angle dependency of the contrast and the switching times, problems result in MLC displays due to inadequate specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, Sept. 1984: A 210–288, Matrix LCD Controlled by Double Stage Diode Rings, p. 141 ff., Paris; STROMER, M., Proc. Eurodisplay 84, Sept. 1984: Design of Thin Film Transistors for Matrix Adressing of Television Liquid Crystal Displays, p. 145 ff., Paris]. As the resistance decreases, the contrast of an MLC display worsens. Since the specific resistance of the liquid-crystal mixture generally decreases over the life of an MLC display due to interactions with the internal surfaces of the display, a high (initial) resistance is very important to give acceptable service lives. In particular, in the case of low-voltage mixtures, it was hitherto not possible to achieve very high specific resistances.

Thus, there continues to be a great demand for MLC displays of very high specific resistance and at the same time a broad operating temperature range, short switching times and low threshold voltage.

The invention has the object of providing media, in particular for MLC displays of this type, which do not have the abovementioned disadvantages or only do so to a lesser extent, and at the same time have very high specific resistances and low threshold voltages.

It has now been found that this object can be achieved if media according to the invention are used in these MLC displays.

The invention thus relates to a liquid-crystalline medium essentially comprising a) 5–65% by weight of a component A, comprising two or more compounds selected from group A:

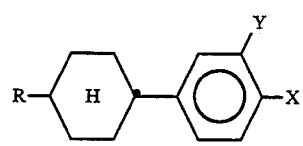

A1

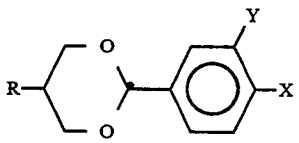

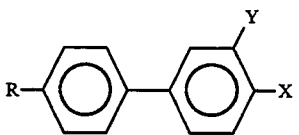

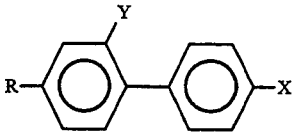

b) 20–95% by weight of a component B comprising two or more compounds selected from group B:

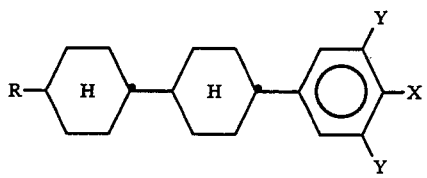

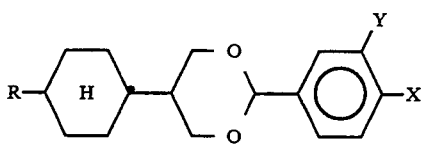

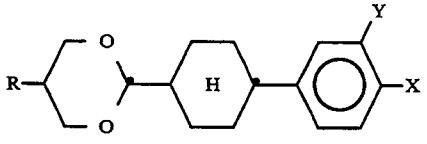

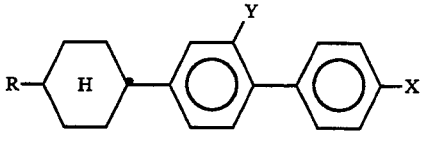

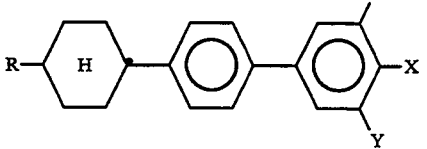

and
c) 0–40% by weight of a component C, comprising one or more compounds having a clearing point above 170° C., preferably from group C:

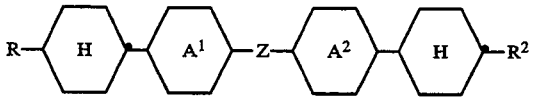

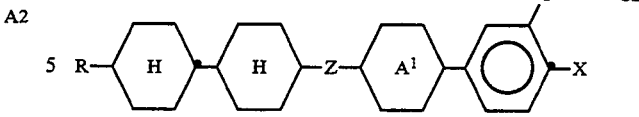

where R, X and Y each, independently of one another, have the following meanings:

R is in each case alkyl, oxaalkyl, haloalkyl or alkenyl having up to 7 carbon atoms, X is F, Cl, $CHF_2$, $CF_3$, $OCHF_2$ or $OCF_3$, and Y is H, F or Cl, $R^2$ is as defined for R, Z is —$C_2H_4$—, —CO—O—, —O—CO— or a single bond, and $A^1$ and $A^2$ are each, independently of one another, trans-1,3-cyclohexylene, 1,4-phenylene or 2- or 3-fluoro-1,4-phenylene.

The invention also relates to electrooptical displays (in particular MLC displays) which contain media of this type, and to the use of these media for electrooptical purposes.

The liquid crystal mixtures according to the invention make it possible to achieve, at low viscosities simultaneously threshold voltages preferably ≦1.65 volts, clearing points above 60°, preferably above 80°, and a high value for the specific resistance, which means that excellent MLC displays can be achieved. It goes without saying that a suitable choice of the components of the mixtures according to the invention also allows higher clearing points (for example above 90°) to be achieved at higher threshold voltages ($V_{th}$<2.2 volts) while retaining the other advantageous properties. Particularly preferred mixtures are those containing components of the formulae B1 and/or B5, which also have surprisingly low threshold voltages and relatively high clearing points. The MLC displays according to the invention preferably operate in the first transmission minimum of Gooch and Tarry [C. H. Gooch and H. A. Tarry, Electron. Lett. 10, 2–4, 1974; C. H. Gooch and H. A. Tarry, Appl. Phys., Vol. 8, 1575–1584, 1975]; in this case, a lower dielectric anisotropy in the second minimum is sufficient in addition to particularly favorable electrooptical properties, such as, for example, high gradient of the characteristic line and low angle dependency of the contrast (German Patent 30 22 818) at the same threshold voltage as in an analogous display. This allows significantly higher specific resistances to be achieved in the first minimum using the mixtures according to the invention. A person skilled in the art can use simple routine methods to produce the birefringence necessary for a prespecified cell thickness of the MLC display by a suitable choice of the individual components and their proportions by weight.

The viscosity at 20° C. is preferably ≦25 mPa.s. The nematic phase range is preferably at least 70°, in particular at least 80°. This range preferably extends at least from −20° to +70°.

The individual compounds, in particular those of the formulae A1 to A4, B1 to B5, C1 and C2 and their subformulae which can be used in the MLC displays according to the invention are either known (International Patent Applications PCT/EP 90/01471, WO 89/02884, DE-A 2 907 332, DE-A 3 042 391, DE-A 2 944 905, European Patent Applications 0 387 032, 0 280 902, 0 051 738 and 0 125 653, and U.S. Pat. Nos. 4,302,352; 4,710,315 and 4,419,264), or can be prepared analogously to the known compounds.

Preferred embodiments are given below:

the proportion of compounds of the formulae A1 to A4 together is from 5 to 45% by weight, preferably from 10 to 40% by weight, in the total mixture the proportion of compounds of the formula B1 to B5 together is from 50 to 95% by weight, preferably from 55 to 90% by weight, in the total mixture the proportion of compounds of the formulae C1 and C2 together is from 0 to 15% by weight, preferably from 2 to 10% by weight, in the total mixture Y in the formula A1 is H X is

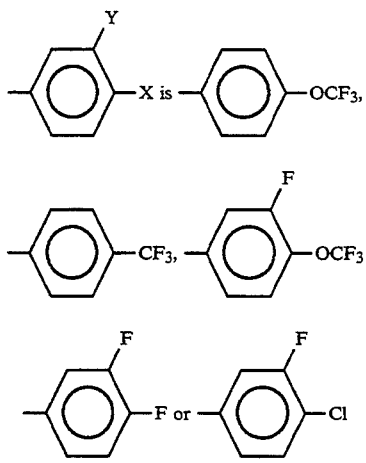

the medium simultaneously contains compounds of the formulae B1 and B4 and/or B5.

R is straight-chain alkyl or alkenyl having from 2 to 7 carbon atoms the medium essentially comprises compounds of the formulae A1, B1 and B4 and/or B5 the medium contains further compounds, preferably selected from the group D below:

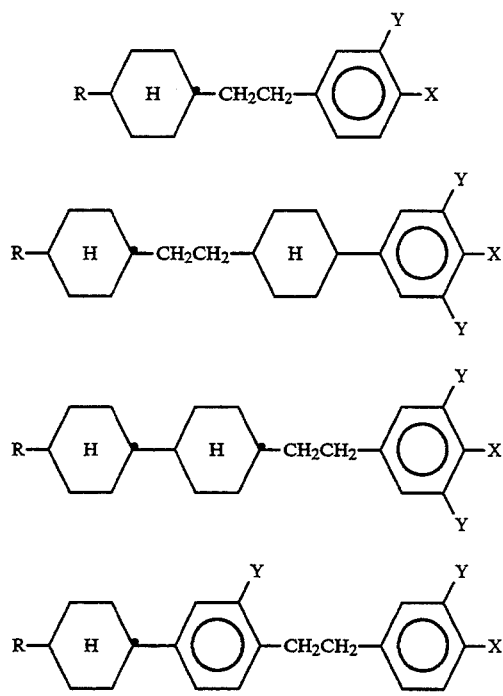

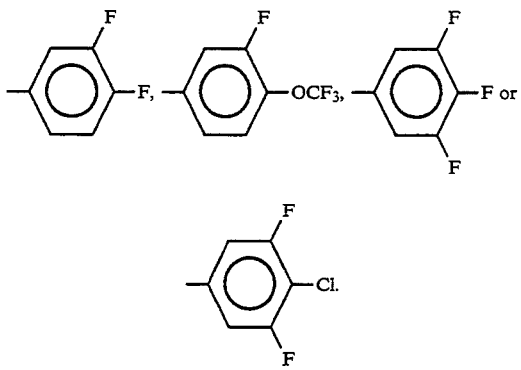

The proportion of these materials is preferably less than 35% by weight, particularly preferably 0 to 15% by weight. D2 and D3 are particularly preferred. R has the preferred meanings indicated.

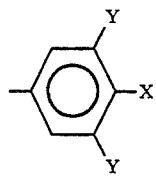

is preferably

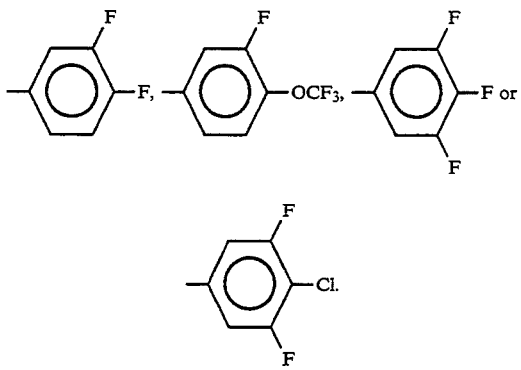

These preferred meanings also apply to B1 and B5.

It has been found that the combination of components A and B results in a significant improvement in the addressing times and in lower threshold voltages, and at the same time broad nematic phases with low smectic-nematic transition temperatures are achieved.

The mixtures according to the invention preferably contain compounds of the formulae B4 and/or B5, preferably in a total proportion of from 15 to 35% by weight, preferably from 20 to 30% by weight. In this particularly preferred embodiment, particularly low threshold voltages and at the same time somewhat increased birefringence are achieved. In B4 and B5, X is preferably F, Cl or $CF_3$ and Y is preferably F, it being possible for one or both of the radicals Y in B5 to be F.

The components of the media according to the invention are colorless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Particularly [sic] alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

Haloalkyl is chloro- or fluoroalkyl, the latter being preferred.

The term "fluoroalkyl" preferably covers straight-chain groups containing terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably 1 and m is preferably from 1 to 6.

Through a suitable choice of the meanings of R, X and Y, the addressing times, the threshold voltage, the gradient of the transmission characteristic lines, etc., can be modified as desired. For example, 1E-alkenyl radicals, 3E-alkenyl radicals, 2E-alkenyloxy radicals and the like generally give shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. A —$CH_2C$-$H_2$— group in $Z^1$ or $Z^2$ generally results in higher values of $k_{33}/k_{11}$ compared with a simple covalent bond. Higher values of $k_{33}/k_{11}$ facilitate, for example, flatter transmission characteristic lines in TN cells with a 90° twist (for achieving grey tones) and steeper transmission characteristic lines in STN, SBE and OMI cells (greater multiplexing ability), and vice versa.

The optimum mixing ratios of the components A, B and C depends substantially on the desired properties, on the choice of the compounds in groups A, B and C and on the choice of any other components which may be present. Suitable mixing ratios within the abovementioned range can easily be determined from case to case.

The mixtures may contain one or more further components (in particular D1, D2, D3, D4 and/or D5) in order to optimise various properties. However, the observed effect on the addressing times and the threshold voltage is generally greater the higher the overall concentration of components A, B and C, which is preferably $\geq 80\%$ by weight. Particularly preferred mixtures are those comprising A, B, C and from 0 to 10% by weight of D.

The mixtures according to the invention preferably contain one or more compounds of the formula A1a. The total amount of compounds of the formula Ia in the mixture is preferably at least 10% by weight, particularly preferably at least 15% by weight.

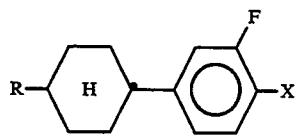

Ala (X is preferably F or Cl, in particular F. Y is H or F).

The construction of the MLC display according to the invention from polarisers, electrode base plates and electrodes with surface treatment corresponds to the construction which is conventional for displays of this type. The term conventional construction here is widely drawn and also covers all derivatives and modifications of the MLC display, in particular also matrix display elements based on poly-Si TFTs or MIMs.

An essential difference between the displays according to the invention and those customary hitherto based on the twisted nematic cell is, however, the choice of liquid-crystal parameters in the liquid-crystal layer.

The liquid-crystal mixtures which can be used according to the invention are prepared in a manner which is conventional per se. In general, the desired amount of the components used in the lesser amount is dissolved in the components making up the principal constituent, expediently at elevated temperature.

The dielectrics may also contain other additives known to those skilled in the art and described in the literature. For example, 0–15% of pleochroic dyes or chiral dopes can be added.

C denotes a crystalline phase, S a smectic phase, $S_B$ a smectic B phase, N a nematic phase and I the isotropic phase. $V_{10}$ denotes the voltage for 10% contrast (view angle perpendicular to the plate surface) measured at $d.\Delta n = 0.4$. $t_{on}$ denotes the switch-on time and $t_{off}$ the switch-off time at an operating voltage corresponding to 2.5 times the value of $V_{10}$. $\Delta n$ denotes the optical anisotropy and $n_o$ the refractive index. $\Delta \epsilon$ denotes the dielectric anisotropy ($\Delta \epsilon = \epsilon_{\parallel} - \epsilon_{\perp}$, where $\epsilon_{\parallel}$ is the dielectric constant parallel to the longitudinal molecular axes and $\epsilon_{\perp}$ is the dielectric constant perpendicular thereto. The electrooptical data were measured in a TN cell at $d.\Delta n = 0.4$ at 20° C., unless expressly stated otherwise. The optical data were measured at 20° C., unless expressly stated otherwise.

The examples below are intended to illustrate the invention without representing a limitation. Above and below all temperatures are given in ° C. The percentages are percent by weight.

The composition of the media of Examples 1 to 34 is indicated below, the individual compounds being coded as follows:

CBC-33F: 4,4'-bis(trans-4-propylcyclohexyl)-2-fluorobiphenyl
CBC-55F: 4,4'-bis(trans-4-pentylcyclohexyl)-2-fluorobiphenyl
CBC-53F: 4-(trans-4-pentylcyclohexyl)-4'-(trans-4-propylcyclcohexyl)-2-fluorobiphenyl [sic]
CBC-33: 4,4'-bis(trans-4-propylcyclohexyl)biphenyl
CBC-55: 4,4'-bis(trans-4-pentylcyclohexyl)biphenyl
CBC-53: 4-(trans-4-pentylcyclohexyl)-4'-(trans-4-propylcyclohexyl)biphenyl
PCH-5F: trans-1-p-fluorophenyl-4-pentylcyclohexane
PCH-6F: trans-1-p-fluorophenyl-4-hexylcyclohexane
PCH-7F: trans-1-p-fluorophenyl-4-heptylcyclohexane
EPCH-20CF$_3$: 1-(trans-4-ethylcyclohexyl)-2-(p-trifluoromethoxyphenyl)ethane
EPCH-30CF$_3$: 1-(trans-4-propylcyclohexyl)-2-(p-trifluoromethoxyphenyl)ethane
EPCH-50CF$_3$: 1-(trans-4-pentylcyclohexyl)-2-(p-trifluoromethoxyphenyl)ethane
EPCH-70CF$_3$: 1-(trans-4-heptylcyclohexyl)-2-(p-trifluoromethoxyphenyl)ethane
PCH-30CF$_3$: trans-1-p-trifluoromethoxyphenyl-4-propylcyclohexane
PCH-50CF$_3$: trans-1-p-trifluoromethoxyphenyl-4-pentylcyclohexane ECCP-3OCF$_3$: 1-[trans-4-(trans-4-propylcyclohexyl)cyclohexyl]-2-(p-trifluoromethoxyphenyl)ethane
ECCP-5OCF$_3$: 1-[trans-4-(trans-4-pentylcyclohexyl)cyclohexyl]-2-(p-trifluoromethoxyphenyl)ethane
CCP-2OCF$_3$: p-[trans-4-(trans-4-ethylcyclohexyl)cyclohexyl]trifluoromethoxybenzene
CCP-3OCF$_3$: p-[trans-4-(trans-4-propylcyclohexyl)cyclohexyl]trifluoromethoxybenzene
CCP-4OCF$_3$: p-[trans-4-(trans-4-butylcyclohexyl)cyclohexyl]trifluoromethoxybenzene
CCP-5OCF$_3$: p-[trans-4-(trans-4-pentylcyclohexyl)cyclohexyl]trifluoromethoxybenzene
BCH-3OCF$_3$: 4-trifluoromethoxy-4'-(trans-4-propylcyclohexyl)biphenyl
ECCP-3F.F: 1-[trans-4-(trans-4-propylcyclohexyl)cyclohexyl]-2-(3,4-difluorophenyl)ethane
ECCP-5F.F: 1-[trans-4-(trans-4-pentylcyclohexyl)cyclohexyl]-2-(3,4-difluorophenyl)ethane
ECCP-2F.F: 1-[trans-4-(trans-4-propylcyclohexyl)cyclohexyl]-2-(3,4-difluorophenyl)ethane
CCP-3F.F: 4-[trans-4-(trans-4-propylcyclohexyl)cyclohexyl]-1,2-difluorobenzene
CCP-2F.F: 4-[trans-4-(trans-4-ethylcyclohexyl)cyclohexyl]-1,2-difluorobenzene
CCP-4F.F: 4-[trans-4-(trans-4-butylcyclohexyl)cyclohexyl]-1,2-difluorobenzene
CCP-5F.F: 4-[trans-4-(trans-4-pentylcyclohexyl)cyclohexyl]-1,2-difluorobenzene
CCP-3F: 4-[trans-4-(trans-4-propylcyclohexyl)cyclohexyl]fluorobenzene
ECCP-3F: 1-[trans-4-(trans-4-propylcyclohexyl)cyclohexyl]-2-(p-fluorophenyl)ethane
ECCP-5F: trans-4-(trans-4-pentylcyclohexyl)cyclohexyl]-2-(p-fluorophenyl)ethane
CP-3F: p-fluorophenyl trans-4-(trans-4-propylcyclohexyl)cyclohexanecarboxylate
CP-5F: p-fluorophenyl trans-4-(trans-4-propylcyclohexyl)cyclohexanecarboxylate [sic]
PYP-2F: 2-p-fluorophenyl-5-ethylpyrimidine
PYP-3F: 2-p-fluorophenyl-5-propylpyrimidine
PYP-5F: 2-p-fluorophenyl-5-pentylpyrimidine
PYP-6F: 2-p-fluorophenyl-5-hexylpyrimidine
PYP-7F: 2-p-fluorophenyl-5-heptylpyrimidine
ECCP-3CF$_3$: 1-[trans-4-(trans-4-propylcyclohexyl)cyclohexyl]-2-(p-trifluoromethylphenyl)ethane
ECCP-5CF$_3$: 1-[trans-4-(trans-4-pentylcyclohexyl)cyclohexyl]-2-(p-trifluoromethylphenyl)ethane
PDX-3F 2-p-fluorophenyl-5-propyl-1,3-dioxane
PDX-4F 2-p-fluorophenyl-5-butyl-1,3-dioxane
PDX-5F 2-p-fluorophenyl-5-pentyl-1,3-dioxane
PDX-3F.F 2-(3,4-difluorophenyl)-5-propyl-1,3-dioxane
PDX-5F.F 2-(3,4-difluorophenyl)-5-pentyl-1,3-dioxane
PDX-3Cl 2-p-chlorophenyl-5-propyl-1,3-dioxane
PDX-4Cl 2-p-chlorophenyl-5-butyl-1,3-dioxane
PDX-5Cl 2-p-chlorophenyl-5-pentyl-1,3-dioxane
PDX-3CF$_3$ 2-p-trifluoromethylphenyl-5-propyl-1,3-dioxane
PDX-4CF$_3$ 2-p-trifluoromethylphenyl-5-butyl-1,3-dioxane
PDX-5CF$_3$ 2-p-trifluoromethylphenyl-5-pentyl-1,3-dioxane
PDX-3OCF$_3$ 2-p-trifluoromethoxyphenyl-5-propyl-1,3-dioxane
PDX-4OCF$_3$ 2-p-trifluoromethoxyphenyl-5-butyl-1,3-dioxane
PDX-5OCF$_3$ 2-p-trifluoromethoxyphenyl-5-pentyl-1,3-dioxane
PCH-3CF$_3$: trans-1-p-trifluoromethylphenyl-4-propylcyclohexane
PCH-5CF$_3$: trans-1-p-trifluoromethylphenyl-4-pentylcyclohexane
PCH-6CF$_3$: trans-1-p-trifluoromethylphenyl-4-hexylcyclohexane
PCH-7CF$_3$: trans-1-p-trifluoromethylphenyl-4-heptylcyclohexane
PCH-3Cl: trans-1-p-chlorophenyl-4-propylcyclohexane
PCH-4Cl: trans-1-p-chlorophenyl-4-butylcyclohexane
PCH-5Cl: trans-1-p-chlorophenyl-4-pentylcyclohexane
PCH-6Cl: trans-1-p-chlorophenyl-4-hexylcyclohexane
PCH-7Cl: trans-1-p-chlorophenyl-4-heptylcyclohexane
BCH-3F.F: 3,4-difluoro-4'-(trans-4-propylcyclohexyl)biphenyl
BCH-5F.F: 3,4-difluoro-4'-(trans-4-pentylcyclohexyl)biphenyl
BCH-3FF: 2',4-difluoro-4'-(trans-4-propylcyclohexyl)biphenyl
BCH-5FF: 2',4-difluoro-4'-(trans-4-pentylcyclohexyl)biphenyl
BCH-3FCF$_3$: 2'-fluoro-4-trifluoromethyl-4'-(trans-4-propylcyclohexyl)biphenyl
BCH-5FCF$_3$: 2'-fluoro-4-trifluoromethyl-4'-(trans-4-pentylcyclohexyl)biphenyl
CCEB-3Cl.F: 1-[trans-4-(trans-4-propylcyclohexyl)cyclohexyl]-2-[p-(4-chloro-3-fluorophenyl)phenyl]ethane [sic]
PCH-3Cl.F: trans-1-(4-chloro-3-fluorophenyl)-4-propylcyclohexane
PCH-5Cl.F: trans-1-(4-chloro-3-fluorophenyl)-4-pentylcyclohexane
BCH-3OCF$_3$.F: 3-fluoro-4-trifluoromethoxy-4'-(transpropylcyclohexyl)biphenyl
BCH-5OCF$_3$.F: 3-fluoro-4-trifluoromethoxy-4'-(transpentylcyclohexyl)biphenyl
BCH-3F.F.F: 3,4,5-trifluoro-4'-(trans-4-propylcyclohexyl)biphenyl
BCH-5F.F.F: 3,4,5-trifluoro-4'-(trans-4-pentylcyclohexyl)biphenyl
CCP-3OCF$_3$.F: 4-[trans-4-(trans-4-propylcyclohexyl)cyclohexyl]-2-fluoro-trifluoromethoxybenzene
CCP-5OCF$_3$.F: 4-[trans-4-(trans-4-pentylcyclohexyl)cyclohexyl]-2-fluoro-trifluoromethoxybenzene
CCP-3F.F.F: 4-[trans-4-(trans-4-propylcyclohexyl)cyclohexyl]-1,2,6-trifluorobenzene
CCP-5F.F.F: 4-[trans-4-(trans-4-pentylcyclohexyl)cyclohexyl]-1,2,6-trifluorobenzene

EXAMPLE 1

| PCH-3OCF$_3$ | 20.0 | S < −40 N 64 I |
| PCH-5F | 10.0 | V$_{10}$ 1.85 volts |
| CCP-2OCF$_3$ | 8.0 | Δn 0.071 |
| CCP-3OCF$_3$ | 13.0 | |
| CCP-4OCF$_3$ | 5.0 | |
| CCF-5OCF$_3$ | 12.0 | |
| ECCP-3F.F | 15.0 | |
| ECCP-5F.F | 12.0 | |
| ECCP-2F.F | 5.0 | |

EXAMPLE 2

| PCH-5F | 17.2 | N 66 I |
| PCH-7F | 16.0 | V$_{10}$ 1.62 volts |
| CCP-2OCF$_3$ | 6.4 | Δn 0.095 |
| CCP-3OCF$_3$ | 10.6 | |
| CCP-4OCF$_3$ | 4.2 | |

-continued

| | | |
|---|---|---|
| CCP-50CF$_3$ | 9.6 | |
| BCH-3F.F | 18.0 | |
| BCH-5F.F | 18.0 | |

EXAMPLE 3

| | | |
|---|---|---|
| PCH-3CF$_3$ | 15.0 | N 64 I |
| PCH-5CF$_3$ | 10.0 | V$_{10}$ 1.50 volts |
| CCP-20CF$_3$ | 7.2 | Δn 0.102 |
| CCP-30CF$_3$ | 11.9 | |
| CCP-40CF$_3$ | 4.7 | |
| CCP-50CF$_3$ | 10.8 | |
| BCH-3F.F | 20.2 | |
| BCH-5F.F | 20.2 | |

EXAMPLE 4

| | | |
|---|---|---|
| PCH-5F | 16.0 | N 65 I |
| PCH-7F | 18.0 | V$_{10}$ 1.64 volts |
| CCP-20CF$_3$ | 10.0 | Δn 0.087 |
| CCP-30CF$_3$ | 12.0 | |
| CCP-40CF$_3$ | 7.0 | |
| CCP-50CF$_3$ | 12.0 | |
| BCH-5F.F | 25.0 | |

EXAMPLE 5

| | | |
|---|---|---|
| PCH-5F | 11.0 | S < −30 N 60 I |
| PCH-6F | 10.0 | V$_{10}$ 1.61 volts |
| PCH-7F | 16.0 | Δn 0.084 |
| CCP-20CF$_3$ | 9.0 | viscosity 12 mPa · s at 20° |
| CCP-30CF$_3$ | 12.0 | |
| CCP-40CF$_3$ | 7.0 | |
| CCP-50CF$_3$ | 12.0 | |
| BCH-3F.F | 10.0 | |
| BCH-5F.F | 13.0 | |

EXAMPLE 6

| | | |
|---|---|---|
| PCH-5F | 10.0 | N 62 I |
| PCH-6F | 9.0 | V$_{10}$ 1.64 volts |
| PCH-7F | 15.0 | Δn 0.087 |
| CCP-20CF$_3$ | 9.0 | |
| CCP-30CF$_3$ | 12.0 | |
| CCP-40CF$_3$ | 7.0 | |
| CCP-50CF$_3$ | 12.0 | |
| BCH-3F.F | 11.0 | |
| BCH-5F.F | 15.0 | |

EXAMPLE 7

| | | |
|---|---|---|
| PCH-5F | 16.0 | S < −30 N 65 I |
| PCH-7F | 18.0 | V$_{10}$ 1.64 volts |
| CCP-20CF$_3$ | 10.0 | Δn 0.087 |
| CCP-30CF$_3$ | 12.0 | |
| CCP-40CF$_3$ | 7.0 | |
| CCP-50CF$_3$ | 12.0 | |
| BCH-5F.F | 25.0 | |

EXAMPLE 8

| | | |
|---|---|---|
| PCH-5F | 12.0 | S < −30 N 63 I |
| PCH-6F | 7.0 | V$_{10}$ 1.65 volts |
| PCH-7F | 16.0 | Δn 0.084 |

-continued

| | | |
|---|---|---|
| CCP-20CF$_3$ | 10.0 | |
| CCP-30CF$_3$ | 12.0 | |
| CCP-40CF$_3$ | 8.0 | |
| CCP-50CF$_3$ | 12.0 | |
| BCH-3F.F | 10.0 | |
| BCH-5F.F | 13.0 | |

EXAMPLE 9

| | | |
|---|---|---|
| PCH-5F | 10.0 | S < −30 N 68 I |
| PCH-6F | 7.0 | V$_{10}$ 1.65 volts |
| PCH-7F | 15.0 | Δn 0.088 |
| CCP-20CF$_3$ | 10.0 | viscosity 13 mPa · s at 20° |
| CCP-30CF$_3$ | 12.0 | |
| CCP-40CF$_3$ | 8.0 | |
| CCP-50CF$_3$ | 12.0 | |
| BCH-3F.F | 10.0 | |
| BCH-5F.F | 16.0 | |

EXAMPLE 10

| | | |
|---|---|---|
| PCH-5F | 11.0 | N 64 I |
| PCH-3CF$_3$ | 10.0 | V$_{10}$ 1.54 volts |
| PCH-5CF$_3$ | 10.0 | Δn 0.091 |
| CCP-20CF$_3$ | 10.0 | |
| CCP-30CF$_3$ | 12.0 | |
| CCP-40CF$_3$ | 7.0 | |
| CCP-50CF$_3$ | 12.0 | |
| BCH-3F.F | 25.0 | |
| CBC-33F | 3.0 | |

EXAMPLE 11

| | | |
|---|---|---|
| PCH-5F | 8.0 | N 63 I |
| PCH-3CF$_3$ | 10.0 | V$_{10}$ 1.56 volts |
| PCH-5CF$_3$ | 13.0 | Δn 0.089 |
| CCP-20CF$_3$ | 10.0 | |
| CCP-30CF$_3$ | 12.0 | |
| CCP-40CF$_3$ | 10.0 | |
| CCP-50CF$_3$ | 12.0 | |
| BCH-5F.F | 22.0 | |
| CBC-33F | 3.0 | |

EXAMPLE 12

| | | |
|---|---|---|
| PCH-7F | 10.0 | N 61 I |
| PCH-3CF$_3$ | 10.0 | V$_{10}$ 1.60 volts |
| PCH-5CF$_3$ | 12.0 | Δn 0.089 |
| CCP-20CF$_3$ | 10.0 | |
| CCP-30CF$_3$ | 14.0 | |
| CCP-40CF$_3$ | 9.0 | |
| CCP-50CF$_3$ | 13.0 | |
| BCH-3F.F | 10.0 | |
| BCH-5F.F | 10.0 | |
| CBC-33F | 2.0 | |

EXAMPLE 13

| | | |
|---|---|---|
| PCH-3CF$_3$ | 15.0 | N 60 I |
| PCH-5CF$_3$ | 15.0 | V$_{10}$ 1.60 volts |
| CCP-20CF$_3$ | 8.0 | Δn 0.087 |
| CCP-30CF$_3$ | 13.0 | |
| CCP-40CF$_3$ | 8.0 | |
| CCP-50CF$_3$ | 13.0 | |
| ECCP-3F.F | 10.0 | |
| BCH-3F.F | 8.0 | |
| BCH-5F.F | 8.0 | |

| CBC-33F | 2.0 |
|---|---|

EXAMPLE 14

| PCH-3CF$_3$ | 15.0 | N 59 I |
| PCH-5CF$_3$ | 15.0 | V$_{10}$ 1.62 volts |
| CCP-20CF$_3$ | 9.0 | Δn 0.087 |
| CCP-30CF$_3$ | 13.0 | |
| CCP-40CF$_3$ | 8.0 | |
| CCP-50CF$_3$ | 13.0 | |
| ECCP-3F.F | 10.0 | |
| BCH-3F.F | 10.0 | |
| BCH-5F.F | 5.0 | |
| CBC-33F | 2.0 | |

EXAMPLE 15

| PCH-3CF$_3$ | 12.0 |
|---|---|
| PCH-5CF$_3$ | 10.0 |
| CCP-2F.F | 7.2 |
| CCP-3F.F | 11.9 |
| CCP-4F.F | 7.7 |
| CCP-5F.F | 10.8 |
| BCH-3F.F | 20.2 |
| BCH-5F.F | 20.2 |

EXAMPLE 16

| PCH-5Cl | 16.0 |
|---|---|
| PCH-7Cl | 18.0 |
| CCP-2F.F | 10.0 |
| CCP-3F.F | 12.0 |
| CCP-4F.F | 7.0 |
| CCP-5F.F | 12.0 |
| BCH-5F.F | 25.0 |

EXAMPLE 17

| PCH-5F | 11.0 |
|---|---|
| PCH-6F | 10.0 |
| PCH-7F | 16.0 |
| CCP-20CF$_3$ | 9.0 |
| CCP-30CF$_3$ | 12.0 |
| CCP-40CF$_3$ | 7.0 |
| CCP-50CF$_3$ | 12.0 |
| BCH-3FF | 10.0 |
| BCH-5FF | 13.0 |

EXAMPLE 18

| PDX-3F.F | 10.0 |
|---|---|
| PCH-6F | 9.0 |
| PCH-7F | 15.0 |
| CCP-20CF$_3$ | 9.0 |
| CCP-30CF$_3$ | 12.0 |
| CCP-40CF$_3$ | 7.0 |
| CCP-50CF$_3$ | 12.0 |
| BCH-3F.F | 11.0 |
| BCH-5F.F | 15.0 |

EXAMPLE 19

| PDX-3F | 16.0 |
|---|---|
| PCH-5F | 18.0 |

| CCP-2F.F | 10.0 |
|---|---|
| CCP-3F.F | 12.0 |
| CCP-4F.F | 7.0 |
| CCP-5F.F | 12.0 |
| BCH-5F.F | 25.0 |

EXAMPLE 20

| PDX-5CF$_3$ | 12.0 |
|---|---|
| PCH-6F | 7.0 |
| PCH-7F | 12.0 |
| CCP-2F.F | 11.0 |
| CCP-3F.F | 13.0 |
| CCP-4F.F | 9.0 |
| CCP-5F.F | 13.0 |
| BCH-3F.F | 10.0 |
| BCH-5F.F | 13.0 |

EXAMPLE 21

| PCH-5Cl | 10.0 |
|---|---|
| PCH-6Cl | 7.0 |
| PCH-7Cl | 15.0 |
| CCP-20CF$_3$ | 10.0 |
| CCP-30CF$_3$ | 12.0 |
| CCP-40CF$_3$ | 8.0 |
| CCP-50CF$_3$ | 12.0 |
| BCH-3F.F | 10.0 |
| BCH-5F.F | 16.0 |

EXAMPLE 22

| PCH-5Cl | 11.0 |
|---|---|
| PCH-3CF$_3$ | 10.0 |
| PCH-5CF$_3$ | 10.0 |
| CCP-20CF$_3$ | 10.0 |
| CCP-30CF$_3$ | 12.0 |
| CCP-40CF$_3$ | 7.0 |
| CCP-50CF$_3$ | 12.0 |
| BCH-5F.F | 25.0 |
| CBC-33F | 3.0 |

EXAMPLE 23

| PCH-7F | 10.0 |
|---|---|
| PCH-3CF$_3$ | 9.0 |
| PCH-5CF$_3$ | 10.0 |
| CCP-20CF$_3$ | 10.0 |
| CCP-30CF$_3$ | 14.0 |
| CCP-40CF$_3$ | 9.0 |
| CCP-50CF$_3$ | 13.0 |
| BCH-3F.F | 10.0 |
| BCH-5F.F | 10.0 |
| CCEB-3Cl.F | 5.0 |

EXAMPLE 24

| PCH-3Cl.F | 15.0 |
|---|---|
| PCH-5Cl.F | 15.0 |
| CCP-20CF$_3$ | 8.0 |
| CCP-30CF$_3$ | 13.0 |
| CCP-40CF$_3$ | 8.0 |
| CCP-50CF$_3$ | 13.0 |
| ECCP-3F.F | 10.0 |
| BCH-3F.F | 8.0 |
| BCH-5F.F | 8.0 |

-continued

| | |
|---|---|
| CBC-33F | 2.0 |

EXAMPLE 25

| | | |
|---|---|---|
| PCH-5F | 10.0 | S < −40 N 91 I |
| PCH-6F | 8.0 | $V_{10}$ 1.95 volts |
| PCH-7F | 6.0 | Δn 0.094 |
| CCP-20CF$_3$ | 8.0 | viscosity 15 mPa · s at 20° |
| CCP-30CF$_3$ | 12.0 | |
| CCP-40CF$_3$ | 9.0 | |
| CCP-50CF$_3$ | 9.0 | |
| BCH-3F.F | 12.0 | |
| BCH-5F.F | 10.0 | |
| ECCP-30CF$_3$ | 5.0 | |
| ECCP-50CF$_3$ | 5.0 | |
| CBC-33F | 2.0 | |
| CBC-53F | 2.0 | |
| CBC-55F | 2.0 | |

EXAMPLE 26

The so-called "holding ratio" of the medium described in Example 25 is measured during exposure to heat (Table I) and UV (Table II) and compared with that of a commercially available MLC mixture.

The "holding ratio" is taken to mean the ratio between the effective driver voltage applied to the MLC display and the actual, effective voltage at the electrode of the addressed pixel.

"Holding Ratio" (HR)=$V_{eff}$(Tr.)/$V_{eff}$(el.)×100 [%][sic]

This value is responsible for the performance, in particular the quality of the contrast, of an MLC display. The method used here to determine the HR is described, for example, in B. Rieger, E. Poetsch and V. Reiffenrath, Proc. der 19. Freiburger Arbeitstagung Flüssigkristalle im April 1990, Freiburg, Federal Republic of Germany, No. 4, 1990.

The commercially available mixture A (ZLI-4277, E. Merck, Darmstadt) has the following composition:

| | | |
|---|---|---|
| PCH-3 | 17.0 | S < −40 N 91 I |
| PCH-4 | 13.0 | $V_{10}$ 2.03 volts |
| PCH-53 | 22.0 | Δn 0.1178 |
| ECCP-31 | 4.0 | viscosity 18 mPa · s at 20° C. |
| ECCP-32 | 4.0 | |
| ECCP-33 | 4.0 | |
| ECCP-53 | 4.0 | |
| BCH-32 | 9.0 | |
| BCH-52 | 9.0 | |
| CBC-33F | 4.0 | |
| CBC-53F | 6.0 | |
| CBC-55F | 4.0 | |

TABLE I

Variation of the "holding ratio" (HR) with temperature

| Mixture | HR [%] 25° C. | HR [%] 100° C. |
|---|---|---|
| A | 98 | 72 |
| Ex. 25 | 99 | 97 |

As Table I shows, the HR of commercially available mixture A drops considerably at elevated temperature, whereas, by contrast, the mixture according to the invention remains virtually unchanged.

TABLE II

UV dependence of the "holding ratio" (HR)

| Mixture | HR [%] 0 hr | HR [%] 1 hr | HR [%] 20 hr | HR [%] 100 hr |
|---|---|---|---|---|
| A | 98 | 86 | 69 | 69 |
| Ex. 25 | 99 | 98 | 98 | 98 |

As Table II shows, the HR of commercially available mixture A drops considerably on relatively long exposure to UV irradiation, whereas, by contrast, the mixture according to the invention remains virtually unchanged.

EXAMPLE 27

| Substance | % by weight | |
|---|---|---|
| PCH-5F | 5.0 | N 92 I |
| PCH-7F | 6.0 | $V_{10}$ 1.5 V (d. Δn = 0.4μ) |
| CCP-20CF$_3$ | 11.0 | Δn 0.094 |
| CCP-30CF$_3$ | 12.0 | $\eta_{20}$ 15 cSt |
| CCP-40CF$_3$ | 10.0 | |
| CCP-50CF$_3$ | 12.0 | |
| BCH-30CF$_3$.F | 12.0 | |
| BCH-5F.F.F | 11.0 | |
| CCP-3F.F.F | 12.0 | |
| CCP-5F.F.F | 9.0 | |

EXAMPLE 28

| Substance | % by weight | |
|---|---|---|
| PCH-5F | 5.0 | N 96 I |
| PCH-7F | 6.0 | $V_{10}$ 1.65 volts |
| CCP-20CF$_3$ | 11.0 | Δn 0.092 |
| CCP-30CF$_3$ | 12.0 | $\eta_{20}$ 15 cSt |
| CCP-40CF$_3$ | 10.0 | |
| CCP-50CF$_3$ | 12.0 | |
| BCH-30CF$_3$.F | 12.0 | |
| BCH-50CF$_3$.F | 11.0 | |
| CCP-3F.F. | 12.0 | |
| CCP-5F.F. | 9.0 | |

EXAMPLE 29

| Substance | % by weight | |
|---|---|---|
| PCH-5F | 5.0 | N 99 I |
| PCH-7F | 6.0 | $V_{10}$ 1.7 volts |
| CCP-20CF$_3$ | 11.0 | Δn 0.096 |
| CCP-30CF$_3$ | 12.0 | $\eta_{20}$ 16 cSt |
| CCP-40CF$_3$ | 10.0 | |
| CCP-50CF$_3$ | 12.0 | |
| BCH-30CF$_3$.F | 12.0 | |
| BCH-50CF$_3$.F | 11.0 | |
| CCP-30CF$_3$.F | 12.0 | |
| CCP-50CF$_3$.F | 9.0 | |

EXAMPLE 30

| Substance | % by weight | |
|---|---|---|
| PCH-5F | 5.0 | N 97 I |
| PCH-7F | 6.0 | $V_{10}$ 1.85 volts |
| CCP-20CF$_3$ | 11.0 | Δn 0.096 |
| CCP-30CF$_3$ | 12.0 | $\eta_{20}$ 17 cSt |
| CCP-40CF$_3$ | 10.0 | |
| CCP-50CF$_3$ | 10.0 | |
| BCH-3F.F | 14.0 | |
| BCH-5F.F | 11.0 | |
| CCP-50CF$_3$.F | 9.0 | |

-continued

| Substance | % by weight |
|---|---|
| CCP-50CF3.F | 9.0 |

EXAMPLE 31

| Substance | % by weight | | |
|---|---|---|---|
| PCH-5F | 5.0 | N 89 I | |
| PCH-7F | 6.0 | $V_{10}$ 1.7 volts | |
| CCP-30CF3 | 12.0 | $\Delta n$ 0.106 | |
| CCP-50CF3 | 10.0 | $\eta_{20}$ 18 cSt | |
| BCH-3F.F | 12.0 | | |
| BCH-5F.F | 11.0 | | |
| BCH-30CF3.F | 12.0 | | |
| BCH-50CF3.F | 11.0 | | |
| CCP-30CF3.F | 12.0 | | |
| CCP-50CF3.F | 9.0 | | |

EXAMPLE 32

| Substance | % by weight | | |
|---|---|---|---|
| PCH-5F | 5.0 | N 91 I | |
| PCH-7F | 6.0 | $V_{10}$ 1.7 volts | |
| CCP-30CF3 | 12.0 | $\Delta n$ 0.093 | |
| CCP-50CF3 | 10.0 | $\eta_{20}$ 17 cSt | |
| CCP-3F.F | 12.0 | | |
| CCP-5F.F | 11.0 | | |
| BCH-30CF3.F | 12.0 | | |
| BCH-50CF3.F | 11.0 | | |
| CCP-30CF3.F | 12.0 | | |
| CCP-50CF3.F | 9.0 | | |

EXAMPLE 33

| Substance | % by weight | | |
|---|---|---|---|
| PCH-5F | 5.0 | N 83 I | |
| PCH-7F | 6.0 | $V_{10}$ 1.7 volts | |
| CCP-2F.F | 12.0 | $\Delta n$ 0.089 | |
| CCP-3F.F | 10.0 | $\eta_{20}$ 18 cSt | |
| CCP-4F.F | 12.0 | | |
| CCP-5F.F | 11.0 | | |
| BCH-30CF3.F | 12.0 | | |
| BCH-50CF3.F | 11.0 | | |
| CCP-30CF3.F | 12.0 | | |
| CCP-50CF3.F | 9.0 | | |

EXAMPLE 34

| Substance | % by weight | | |
|---|---|---|---|
| PCH-5F | 5.0 | N 86 I | |
| PCH-7F | 6.0 | $V_{10}$ 1.8 volts | |
| CCP-2F.F | 12.0 | $\Delta n$ 0.093 | |
| CCP-3F.F | 10.0 | $\eta_{20}$ 17 cSt | |
| CCP-4F.F | 12.0 | | |
| CCP-5F.F | 11.0 | | |
| BCH-30CF3.F | 12.0 | | |
| BCH-50CF3.F | 11.0 | | |
| CCP-30CF3 | 12.0 | | |
| CCP-50CF3 | 9.0 | | |

We claim:
1. A liquid-crystalline medium consisting essentially of:
a) 5–65% by weight of a component A, which is two or more compounds selected from group A:

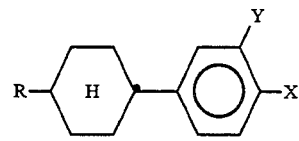 A1

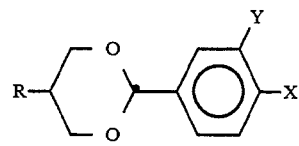 A2

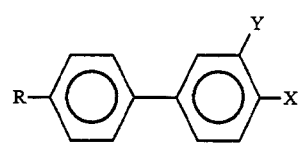 A3

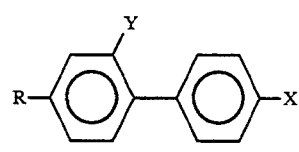 A4 b) 20–95% by weight of a component B which is two or more compounds selected from group B:

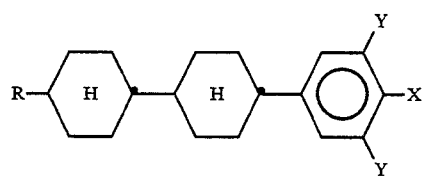 B1

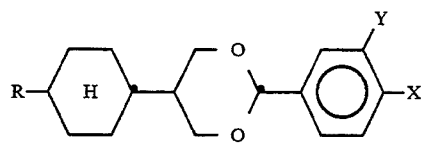 B2

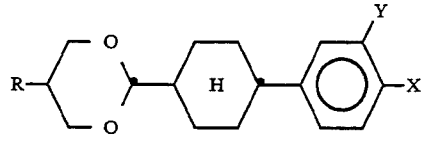 B3

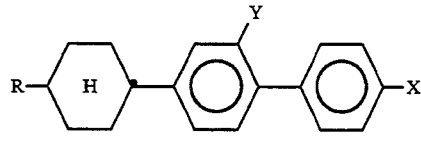 B4

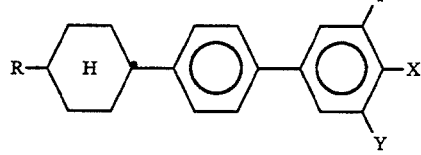 B5 c) 0–40% by weight of a compound C, which is one or more compounds having a clearing point above 170° C., and d) 0–35% by weight of a component D, which is one or more compounds selected from group D:

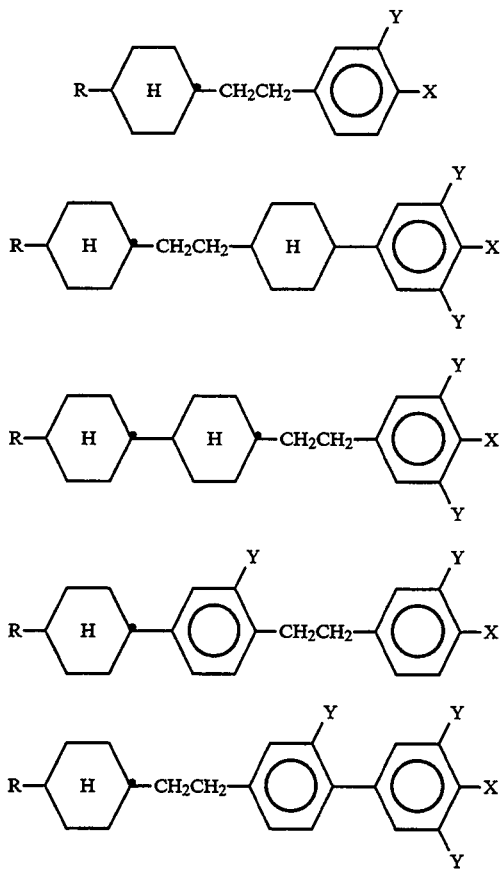

where R, X and Y each, independently of one another, have the following meanings:

R is in each case alkyl, oxaalkyl, haloalkyl or alkenyl having up to 7 carbon atoms, X is F, Cl, $CHF_2$, $CF_3$, $OCHF_2$, or $OCF_3$, and Y is H, F or Cl, with the provisos that (1) the proportion of compounds of formula B5 is from 15 to 40% by weight in the total mixture; and (2)(a) the medium contains at least one compound of formula A2, B2 or B3, or (b) the medium contains at least one compound of formula A1, A2, A3, A4, B1, B2, B3, B4 or B5 in which R is oxaalkyl or haloalkyl.

2. A medium according to claim 1, wherein component C contains one or more compounds selected from group C:

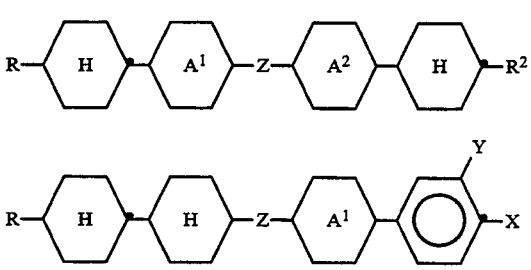

in which R, X and Y are as defined in claim 1, $R^2$ is as defined for R, Z is $-C_2H_4-$, $-CO-O-$, $-O-CO-$ or a single bond, and $A^1$ and $A^2$ are each, independently of one another, trans-1,4-cyclohexylene, 1,4-phenylene or 2- or 3-fluoro-1,4-phenylene.

3. An electrooptical liquid-crystalline display containing a medium according to claim 1.

4. A method of manipulating the optical properties of the liquid-crystalline medium of claim 1 which comprises applying a voltage to said liquid-crystalline medium.

5. A liquid-crystalline medium as in claim 1 which comprises compounds of the formula A2, defined in claim 1.

6. A liquid-crystalline medium as in claim 1 which comprises compounds of the formula B2, defined in claim 1.

7. A liquid-crystalline medium as in claim 1 which comprises compounds of the formula B3, defined in claim 1.

8. A liquid-crystalline medium according to claim 1, wherein the proportion of the compounds from the group D is 0 to 15% by weight.

9. A liquid-crystalline medium according to claim 1, which contains one or more compounds of the formula D2 and/or D3.

10. A liquid-crystalline medium according to claim 1, wherein one or both of the radicals Y in B5 is F.

11. A liquid-crystalline medium according to claim 1, wherein components A, B and C form together $\geq 80$ % by weight of the medium.

12. A liquid-crystalline medium according to claim 5, wherein the proportion of the compounds from the group D is 0 to 10 % by weight of the medium.

13. A liquid-crystalline medium according to claim 1, which contains one or more compounds of the formula A1.

14. A liquid-crystalline medium according to claim 1, wherein

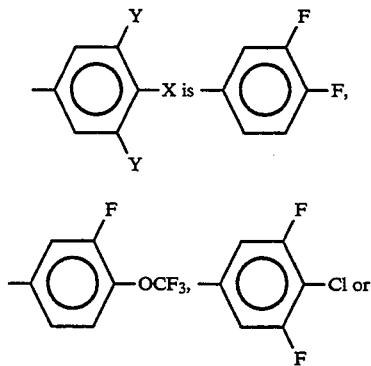

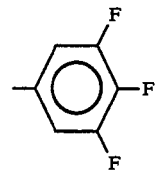

in B1 and B5.

15. A liquid-crystalline medium according to claim 1, which contains compounds of the formula B1.

16. A liquid-crystalline medium according to claim 1, wherein the proportion of compounds of the formula B1 to B5 together is from 50 to 95% by weight in the total mixture.

17. A liquid-crystalline medium according to claim 1, wherein

X is 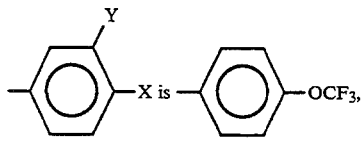
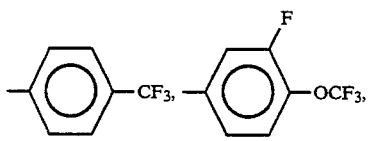
-continued
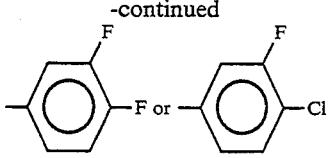
in formula A1.
18. A liquid-crystalline medium according to claim 1, consisting essentially of A1, B1, B4 and/or B5.
19. A liquid-crystalline medium according to claim 1, which is essentially free of cyano-containing compounds.
20. A liquid-crystalline medium according to claim 1, which is free of cyano-containing compounds.
* * * * *